United States Patent
Ali

(10) Patent No.: US 7,447,033 B2
(45) Date of Patent: Nov. 4, 2008

(54) EMBEDDED THERMAL-ELECTRIC COOLING MODULES FOR SURFACE SPREADING OF HEAT

(75) Inventor: Ihab A. Ali, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 11/591,851

(22) Filed: Nov. 1, 2006

(65) Prior Publication Data

US 2008/0101038 A1 May 1, 2008

(51) Int. Cl.
H05K 7/20 (2006.01)

(52) U.S. Cl. .................. 361/704; 361/719; 361/720; 165/80.3; 257/712

(58) Field of Classification Search .............. None
See application file for complete search history.

(56) References Cited

U.S. PATENT DOCUMENTS

| | | | |
|---|---|---|---|
| 6,038,128 A * | 3/2000 | Hood et al. ............... | 361/687 |
| 6,362,959 B2 * | 3/2002 | Tracy ....................... | 361/687 |
| 6,434,000 B1 * | 8/2002 | Pandolfi ................... | 361/685 |
| 6,525,934 B1 | 2/2003 | Nakanishi et al. | |
| 6,678,168 B2 * | 1/2004 | Kenny et al. ............. | 361/764 |
| 6,882,536 B2 * | 4/2005 | Deeney et al. ............ | 361/719 |
| 6,945,312 B2 * | 9/2005 | Czubarow et al. ........ | 165/80.3 |
| 2003/0184941 A1 | 10/2003 | Maeda et al. | |
| 2005/0193742 A1 * | 9/2005 | Arnold ...................... | 62/3.5 |
| 2007/0000642 A1 * | 1/2007 | Yamazaki et al. ........ | 165/80.3 |

FOREIGN PATENT DOCUMENTS

| JP | 2002190687 A | 7/2002 |
|---|---|---|
| JP | 2002278654 A | 9/2002 |

\* cited by examiner

*Primary Examiner*—Boris L Chervinsky
(74) *Attorney, Agent, or Firm*—Park, Vaughan & Fleming LLP; Steven E. Stupp

(57) ABSTRACT

A portable computing device includes a housing having an external surface and an inner surface. A solid-state cooling mechanism in the computing device is coupled to the inner surface. This solid-state cooling mechanism is configured to maintain a temperature difference across at least a portion of the external surface that is less than a pre-determined value.

20 Claims, 4 Drawing Sheets

~ 400

```
┌─────────────────────────────────────────────────────────────────┐
│   PROVIDE POWER TO A SOLID-STATE COOLING MECHANISM, WHERE THE   │
│  SOLID-STATE COOLING MECHANISM IS COUPLED TO AN INNER SURFACE OF A │
│                             HOUSING                             │
│                              410                                │
└─────────────────────────────────────────────────────────────────┘
                                │
                                ▼
┌─────────────────────────────────────────────────────────────────┐
│   TRANSPORT HEAT AWAY FROM THE INNER SURFACE OF THE HOUSING TO  │
│  MAINTAIN A TEMPERATURE DIFFERENCE ACROSS AT LEAST A PORTION OF AN │
│     EXTERNAL SURFACE OF THE HOUSING, WHERE THE TEMPERATURE      │
│         DIFFERENCE IS LESS THAN A PRE-DETERMINED VALUE          │
│                              412                                │
└─────────────────────────────────────────────────────────────────┘
```

FIG. 4

EMBEDDED THERMAL-ELECTRIC COOLING MODULES FOR SURFACE SPREADING OF HEAT

BACKGROUND

1. Field of the Invention

The present invention relates to heat-transfer techniques. More specifically, the present invention relates to solid-state cooling components that reduce surface temperatures in computer systems.

2. Related Art

The computational performance provided by electronic devices has increased significantly in recent years. This has resulted in increased power consumption and associated heat generation in these devices. Consequently, it has become a considerable challenge to manage this thermal load to maintain acceptable internal and external operating temperatures for these devices.

Portable devices, such as laptop computers (notebook PCs), cellular telephones, and personal digital assistants pose additional design constraints. In particular, size and weight limitations in such devices can make it difficult to achieve desired operational temperatures. For example, many laptop computers utilize cooling systems that include fans to pump heat out of the laptop computer. Unfortunately, hot spots can still occur on a bottom surface of these laptop computers. Such hot spots are easily noticed by consumers and are annoying because they often may make it difficult to use the devices. For example, a consumer may be forced to position a laptop computer to avoid a hot spot. However, it may be more difficult to use the computer in such positions.

Hence what is needed are computer systems that overcome the problems listed above.

SUMMARY

One embodiment of the present invention provides a portable computing device that includes a housing having an external surface and an inner surface. A solid-state cooling mechanism in the computing device is coupled to the inner surface. This solid-state cooling mechanism is configured to maintain a temperature difference across at least a portion of the external surface that is less than a pre-determined value.

In some embodiments, the solid-state cooling mechanism is configured to thermo-electrically transport heat. For example, the solid-state cooling component may use the Peltier effect. Thus, the solid-state cooling component may include a thermal-electric cooler and/or one or more p/n junctions. Furthermore, the solid-state cooling mechanism is configured to remain stationary while transporting heat away from the inner surface.

In some embodiments, the solid-state cooling mechanism transports heat associated with the operation of one or more integrated circuits in the portable computing device.

In some embodiments, at least a portion of the external surface includes a bottom surface of the portable computing device.

In some embodiments, the solid-state cooling mechanism is one of two or more solid-state cooling mechanisms coupled to the inner surface. Furthermore, the two or more solid-state cooling mechanisms may be arranged in an array.

In some embodiments, the portable computing device includes motherboard that provides power to the solid-state cooling mechanism.

In some embodiments, the portable computing device includes a heat-diffusion layer and a thermal-interface layer. Note that a first end of the solid-state cooling mechanism may be coupled to the inner surface of the housing and a second end of the solid-state cooling mechanism may be coupled to the heat-diffusion layer. Furthermore, the thermal-interface layer may be coupled to a portion of the heat-diffusion layer and the inner surface of the housing at a different location than the first end of the solid-state cooling mechanism.

Another embodiment provides a method for cooling the external surface of the housing in the portable computing device. Initially, the portable computing device provides power to the solid-state cooling mechanism. Then, the solid-state cooling mechanism transports heat from the inner surface of the housing to maintain the temperature difference across at least a portion of the external surface of the housing.

BRIEF DESCRIPTION OF THE FIGURES

FIG. 4 is a flow chart illustrating a process for cooling an external surface of a housing of a portable computing device in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a portable computing device and a method for cooling an external surface of a housing in the portable computing device are described. Note that the portable computing device may include laptop computers (notebook PCs), as well as portable electronic devices, such as cellular telephones, personal digital assistants, game consoles, and MP3 players. The portable computing device may include one or more solid-state cooling mechanisms (such as thermal-electric coolers, devices that use a Peltier effect, and/or devices that thermo-electrically transport heat) which are coupled to an inner surface of the housing of the portable computing device. These solid-state cooling mechanisms may be used to transport heat associated with operation of one or more integrated circuits in the portable computing device. In particular, the one or more solid-state cooling mechanisms may receive power from a motherboard in the portable computer system and may be configured to maintain a temperature difference across at least a portion of the external surface that is less than a pre-determined value. Furthermore, at least a portion of the external surface may include a bottom surface of the portable computing device.

Note that in some embodiments, the portable computing device includes a heat-diffusion layer and a thermal-interface layer. A first end of the solid-state cooling mechanism may be coupled to the inner surface of the housing and a second end of the solid-state cooling mechanism may be coupled to the heat-diffusion layer. Furthermore, the thermal-interface layer may be coupled to a portion of the heat-diffusion layer and the inner surface of the housing at a different location than the first end of the solid-state cooling mechanism.

Figure 1:
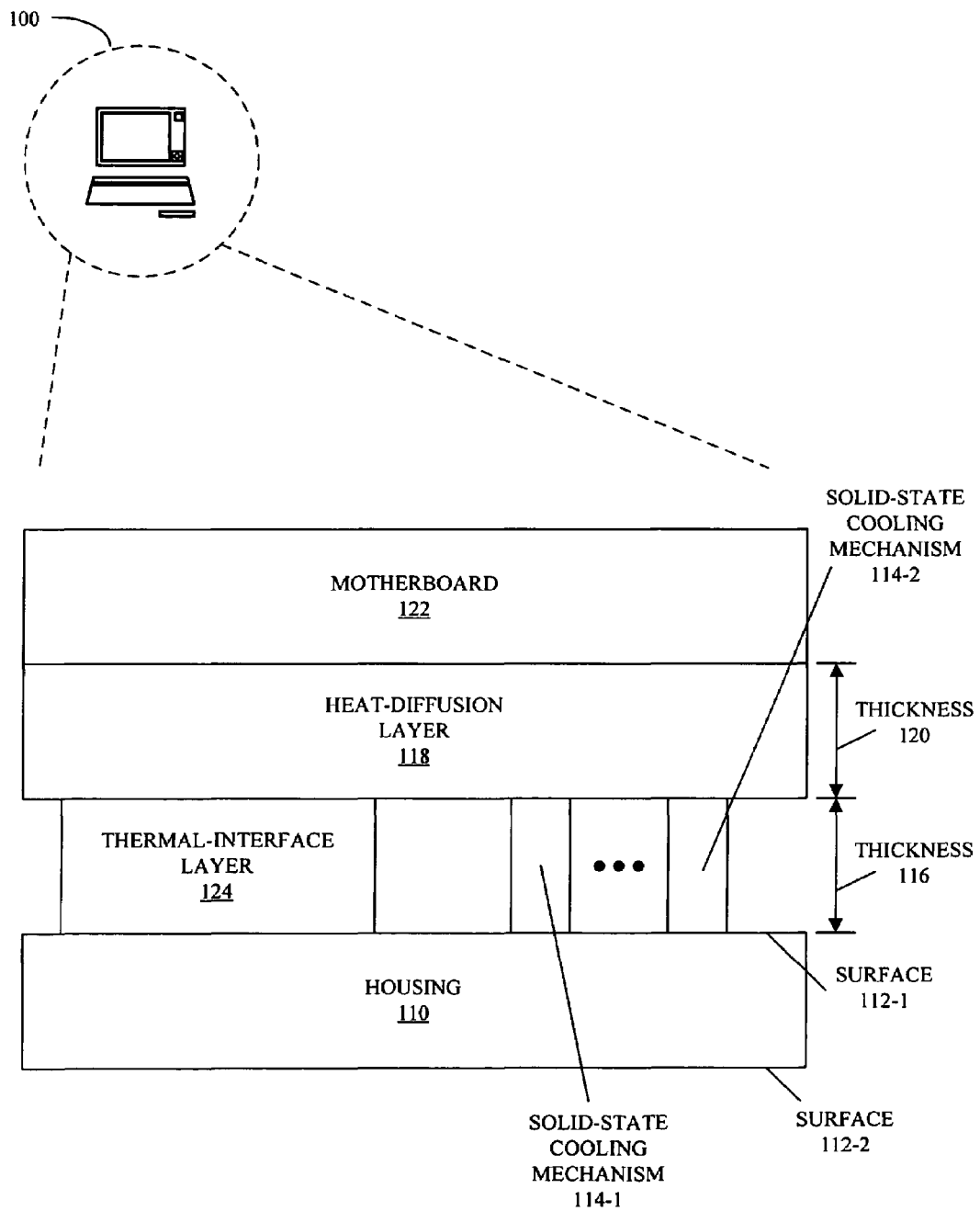
FIG. 1 is a block diagram illustrating a portable computing device in accordance with an embodiment of the present invention.

We now describe embodiments of the portable computing device and the method for cooling the external surface of the housing in the portable computing device. FIG. 1 provides a block diagram illustrating a side view of a portable computing device 100 in accordance with an embodiment of the present invention. Portable computing device 100 includes a circuit board, such as motherboard 122, that includes one or more integrated circuits. This circuit board is enclosed in a housing, such as housing 110. Note that only a portion of the housing is illustrated. In an exemplary embodiment, the housing 110 includes bottom plate of the portable computing device 100.

During operation, heat generated by components on the motherboard 122 may diffuse or spread to an external surface 112-2 of the housing 110. Such elevated temperatures and/or temperature gradients on this surface are easily noticed by users of the portable computing device 100. In addition, the elevated temperatures may obstruct use of the device. For example, if the surface 112-2 is a bottom surface, users may be uncomfortable resting the portable computing device 100 on their laps. As a consequence, the users may move the device to a position where it is inconvenient or difficult to view a display or interact with a user interface (such as a keyboard). Therefore, users typically do not like devices that have elevated temperatures and/or temperature gradients on the surface 112-2.

As illustrated in FIG. 1, portable computing device 100 provides a solution to this design challenge. In particular, one or more solid-state cooling mechanisms 114 are coupled to an inner surface 112-1 of the housing 110. Note that these cooling elements may receive power from the motherboard 122. The solid-state cooling mechanisms 114 may transport heat away from the surface 112-1 without macroscopic moving parts (i.e., the devices are stationary when transporting heat). In this way, the temperature and/or temperature gradients on the surface 112-2 may be reduced and/or eliminated.

In some embodiments, another end of the solid-state cooling mechanisms 114 is coupled to a heat-diffusion layer 118. This layer may be used to spread or diffuse the heat transported by the solid-state cooling mechanisms 114 to another region(s) of the portable computing device 100. For example, the other region(s) may have higher airflow (which may be provided by a forced-fluid driver, such as a fan). Furthermore, the heat-diffusion layer 118 may be thermally coupled to the surface 112-1 in the other region(s) by a thermal-interface layer 124. In this way, the heat that is diffused by the heat-diffusion layer 118 may be coupled to a section of the housing 110 that has a lower temperature, i.e., this portion of the housing 110 may be used as a heat sink. Note that heat-diffusion layer 118 may include graphite, aluminum, magnesium, copper, an aluminum alloy, a magnesium alloy, and/or a copper alloy. In addition, note that thermal-interface layer 124 may include a silicon-based grease compound, an organic-based grease compound, a thermal-grease compound, a polymer, solder, and/or a thermal-gap pad.

Figure 2:
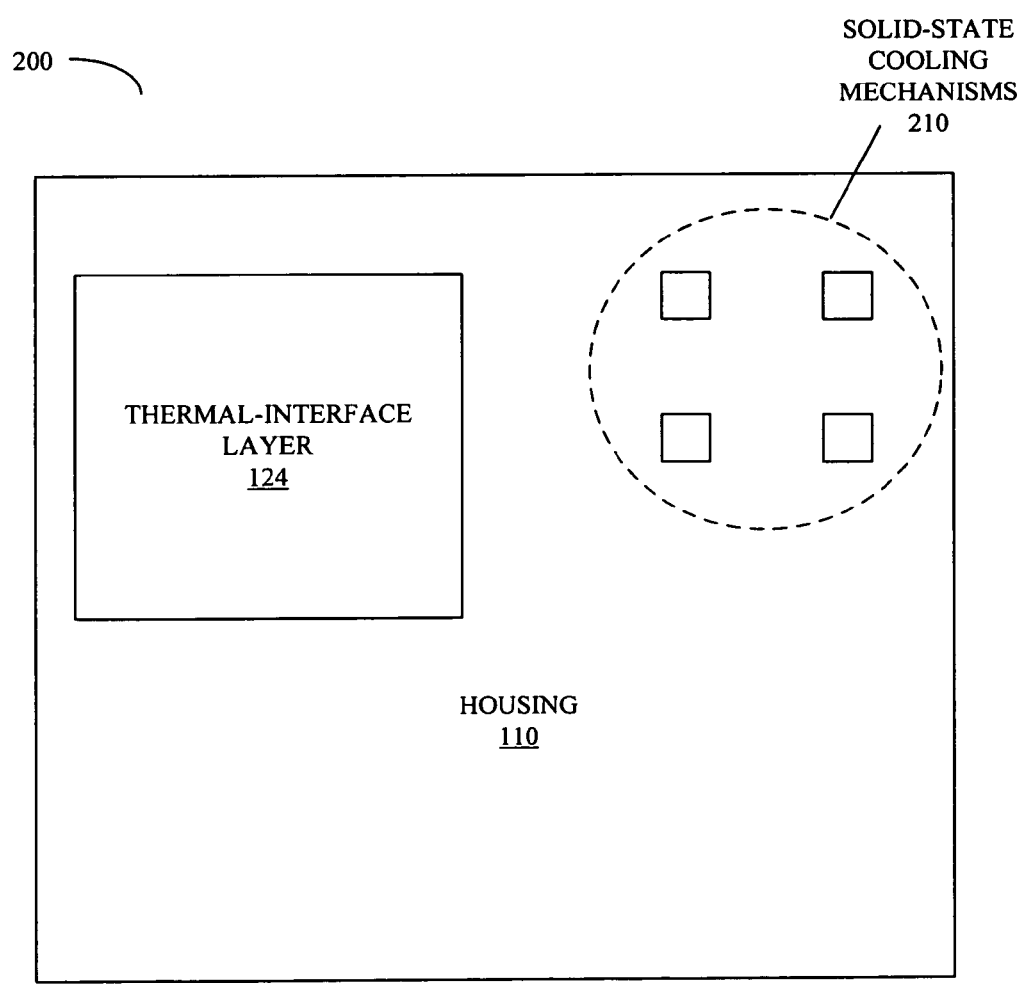
FIG. 2 is a block diagram illustrating a portable computing device in accordance with an embodiment of the present invention.

The use of solid-state cooling mechanisms is further illustrated in FIG. 2, which provides a block diagram of a portable computing device 200 in accordance with an embodiment of the present invention. In this embodiment, an array of solid-state cooling mechanisms 210 transport heat from a hot spot on the housing 110 to the heat-diffusion layer (not shown) and then, through thermal-interface layer 124, to a lower-temperature region of the housing 110.

Referring back to FIG. 1, the solid-state cooling mechanisms 114 may include devices that use a Peltier effect and/or devices that thermo-electrically transport heat. For example, the solid-state cooling mechanisms 114 may include thermal-electric coolers (TECs). Such TECs may be implemented using one or more p/n junctions in a semiconductor device and may be powered by providing current from the motherboard 122. Furthermore, so-called micro-TECs may be very small (i.e., compact). Therefore, thickness 116 may be less than or equal to 100 µm. In some embodiments, this may allow one or more of the solid-state cooling mechanisms 114 to be at least partially embedded in a 'thinned out' section of the housing 110, i.e., in a portion of the housing wall that has reduced thickness.

In an exemplary embodiment, each of the solid-state cooling mechanisms 114 are configured to use less than or equal to 100 mW of power when transporting heat, and heat-diffusion layer 118 and may have a thickness 120 less than or equal to 0.5 mm. Furthermore, thermal-interface layer 124 may be a Shin-Etsu thermal grease model X23-7783DS.

Note that in some embodiments the portable computing devices 100 and/or 200 (FIG. 2) include fewer or additional components, two or more components are combined into a single component, and/or a position of one or more components may be changed. For example, in some embodiments there may be fewer or additional solid-state mechanisms 114. Furthermore, in some embodiments the heat-diffusion layer 118 and/or the thermal-interface layer 124 may be removed.

Figure 3A:
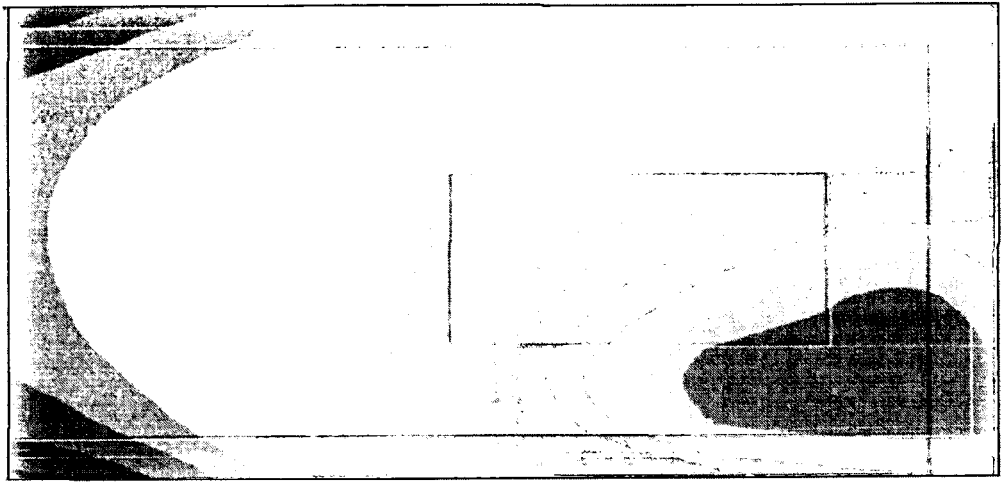
FIG. 3A is block diagram illustrating simulated temperature on an external surface of a portable computing device in accordance with an embodiment of the present invention.
Figure 3B:
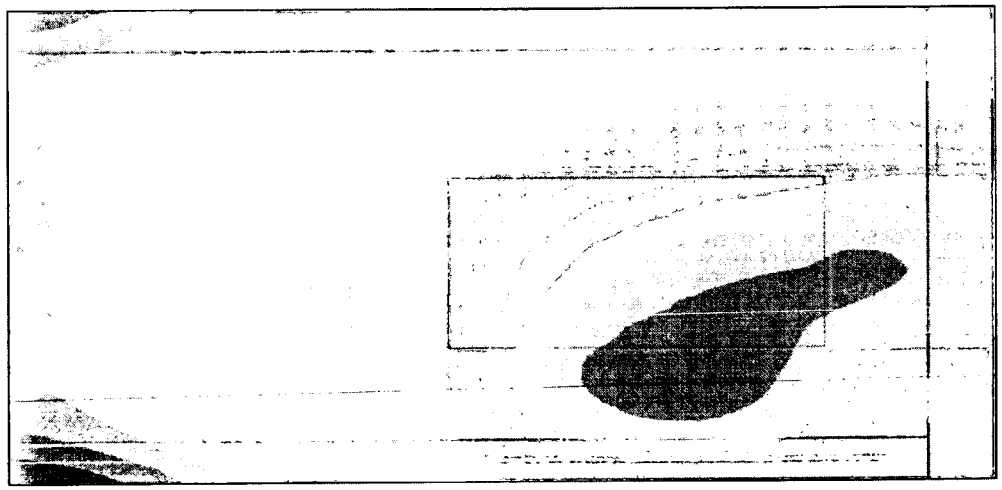
FIG. 3B is block diagram illustrating simulated temperature on an external surface of a portable computing device in accordance with an embodiment of the present invention.

We now describe the results of thermal simulations of a portable computing device that includes active transport of heat away from an external surface using one or more solid-state cooling mechanisms. These simulations were performed using commercially available computational fluid dynamics software, such as Icepak™ (from Ansys, Inc., of Canonsburg, Pa.). FIG. 3A provides a block diagram illustrating simulated temperature on an external surface of a portable computing device 300 in accordance with an embodiment of the present invention, and FIG. 3B provides a block diagram illustrating simulated temperature on an external surface of a portable computing device 350 in accordance with an embodiment of the present invention. Note that computer system 350 includes a TEC located near the lower right-hand corner. Furthermore, the TEC reduces the maximum temperature on the external surface and reduces temperature gradients over the external surface. In particular, during operation the simulated maximum temperature on the external surface of the portable computing device 350 was 3.5 C less than the simulated maximum temperature on the external surface of the portable computing device 300. In addition, the simulated temperature difference over the entire external surface of the portable computing device 350 was 5.5 C, as opposed to 8.5 C over the entire external surface of the portable computing device 300. In other embodiments, the simulated temperature for the portable computing device 350 was 3 C, as opposed to 25 C for the portable computing device 300.

We now discuss methods for cooling an external surface of a housing in a portable computing device. FIG. 4 provides a flow chart illustrating a process 400 for cooling an external surface of a housing in a portable computing device in accordance with an embodiment of the present invention. During this process, power is provided to a solid-state cooling mechanism (410). Note that the solid-state cooling mechanism is coupled to an inner surface of a housing. Then, heat is transported away from the inner surface of the housing to maintain a temperature difference across at least a portion of the external surface of the housing (412). This temperature difference may be less than a pre-determined value. Note that in some embodiments there may be additional or fewer operations, the order of the operations may be changed, and two or more operations may be combined into a single operation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A portable computing device, comprising:
    a housing having an external surface and an inner surface;
    a heat-diffusion layer; and
    a solid-state cooling mechanism with a first end coupled to the inner surface of the housing and a second end coupled to the heat-diffusion layer,
    wherein the solid-state cooling mechanism is configured to maintain a temperature difference across at least a portion of the external surface by transporting heat away from the inner surface of the housing, and wherein the temperature difference is less than a pre-determined value.

2. The portable computing device of claim 1, wherein the solid-state cooling mechanism is configured to thermo-electrically transport heat.

3. The portable computing device of claim 1, wherein the solid-state cooling mechanism includes one or more p/n junctions.

4. The portable computing device of claim 1, wherein the solid-state cooling mechanism functions by using the Peltier effect.

5. The portable computing device of claim 1, wherein the solid-state cooling mechanism includes a thermal-electric cooler.

6. The portable computing device of claim 1, wherein the solid-state cooling mechanism is configured to remain stationary while transporting heat away from the inner surface.

7. The portable computing device of claim 1, wherein the solid-state cooling mechanism transports heat is associated with operation of one or more integrated circuits in the portable computing device.

8. The portable computing device of claim 1, wherein the solid-state cooling mechanism has a thickness less than or equal to 100 μm.

9. The portable computing device of claim 1, wherein at least a portion of the external surface includes a bottom surface of the portable computing device.

10. The portable computing device of claim 1, wherein the pre-determined value is less than 7 C.

11. The portable computing device of claim 1, wherein the pre-determined value is less than 5 C.

12. The portable computing device of claim 1, further comprising one or more additional solid-state cooling mechanisms coupled to the inner surface of the housing.

13. The portable computing device of claim 1, wherein the two or more solid-state cooling mechanisms are arranged in an array.

14. The portable computing device of claim 1, further comprising a motherboard, wherein the solid-state cooling mechanism is powered by the motherboard.

15. The portable computing device of claim 1, wherein the solid-state cooling mechanism is configured to use a power less than or equal to 100 mW when transporting heat.

16. The portable computing device of claim 1, further comprising a thermal-interface layer coupled to a portion of the heat-diffusion layer and the inner surface of the housing, wherein the thermal-interface layer is coupled to the inner surface of the housing at a different location than the first end of the solid-state cooling mechanism.

17. The portable computing device of claim 16, wherein the heat-diffusion layer includes one of:
    graphite;
    aluminum;
    magnesium;
    copper;
    an aluminum alloy;
    a magnesium alloy; and
    a copper alloy.

18. The portable computing device of claim 16, wherein the heat-diffusion layer has a thickness less than or equal to 0.5 mm.

19. The portable computing device of claim 16, wherein the thermal-interface layer includes one of:
    a silicon-based grease compound;
    an organic-based grease compound;
    a thermal-grease compound;
    a polymer;
    solder; and
    a thermal-gap pad.

20. A method for cooling an external surface of a housing in a portable computing device that includes a solid-state cooling mechanism with a first end coupled to an inner surface of the housing and a second end coupled to a heat-diffusion layer, comprising: using the solid-state cooling mechanism to maintain a temperature difference across at least a portion of the external surface by transporting heat away from the inner surface of the housing to the heat-diffusion layer, wherein the temperature difference is less than a pre-determined value.

* * * * *